United States Patent
Delic et al.

(10) Patent No.: US 7,263,519 B2
(45) Date of Patent: Aug. 28, 2007

(54) PROCESS FOR SEARCHING A REPOSITORY OF RESOURCES

(75) Inventors: Kemal Delic, Grenoble (FR); Laurent Douillet, St Martin de la Cluze (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 507 days.

(21) Appl. No.: 10/760,918

(22) Filed: Jan. 20, 2004

(65) Prior Publication Data

US 2004/0186830 A1 Sep. 23, 2004

(30) Foreign Application Priority Data

Jan. 29, 2003 (EP) .................. 03290216

(51) Int. Cl.
*G06F 17/30* (2006.01)
(52) U.S. Cl. .................. 707/3; 707/4; 707/5
(58) Field of Classification Search .............. 707/1–3
See application file for complete search history.

(56) References Cited

U.S. PATENT DOCUMENTS

| | | | |
|---|---|---|---|
| 5,794,237 A | 8/1998 | Gore, Jr. | |
| 6,012,053 A | 1/2000 | Schiegg et al. | |
| 6,269,364 B1 | 7/2001 | Gallagher et al. | |
| 2003/0037251 A1* | 2/2003 | Frieder et al. ............ | 713/200 |
| 2006/0018506 A1* | 1/2006 | Rodriguez et al. .......... | 382/100 |

FOREIGN PATENT DOCUMENTS

| | | |
|---|---|---|
| EP | 1170677 A | 1/2000 |
| WO | WO 0077689 A | 12/2000 |
| WO | WO 0221325 A | 3/2002 |

OTHER PUBLICATIONS

Delic, Kemal, et al., Knowledge Harvesting Articulation, and Delivery (XP-000865348), The Hewlett Packard Journal, May 1998, pp. 74-81.

Delic, Kemal, "Knowledge Management in the Service and Support Business" (XP-002248452), Hewlett Packard Journal, Oct. 30, 2000, pp. 7.1-7.7.

Delic, Kemal, et al., "Knowledge-Based Support in Help-Desk Environments", IT Pro, Jan./Feb. 2000, pp. 44-48.

* cited by examiner

*Primary Examiner*—Alford W. Kindred
(74) *Attorney, Agent, or Firm*—Thomas, Kayden, Horstemeyer & Risley, LLP

(57) ABSTRACT

A process for accelerating search in a repository of resources indexed by a search engine. Each resource is classified in accordance with a least a first classification level. The process comprises the steps of: monitoring the access to said repository by the users and creating a shortcut index of resources which are flagged by the users in order to develop experience from the use of the repository; processing each new query entered by one user by a first preliminary searching within said shortcut index, followed by a standard search within the whole repository.

13 Claims, 5 Drawing Sheets

PROBLEMS

|   |   |   |   |
|---|---|---|---|
|   |   |   |   |
|   | (index1, keywords...) .... (index n, keywords...) |   |   |
|   |   |   |   |
|   |   |   |   |
|   |   |   |   |
|   |   |   |   |

PRODUCTS

Fig. 3

PROCESS FOR SEARCHING A REPOSITORY OF RESOURCES

TECHNICAL FIELD OF THE INVENTION

The invention relates to Information Retrieval (IR) techniques and more particularly to processes, and related computer programs, for storing and retrieving a document within a knowledge base or repository of resources.

BACKGROUND ART

The progress of Information Technology and the development of computer systems has allowed the creation of very large knowledge bases containing thousands of documents and electronic files. Computers are used for collecting, storing, sorting and quickly retrieving references to documents contained within such repositories. The exploitation of such repositories has commonly been based on the use of indexing techniques that allow keyword-based searches for the retrieval of the documents upon request. By formulating a query based on a given set of keywords, a search engine generally provides a ranked output list of documents.

IR techniques have been employed in a wide variety of situations where a user needs precise and quick access to reference documents. One example of such a situation is helpdesk or hotline services which are organised for providing quick and effective technical support to customers of computer and other products. Indeed, the daily work of help-desk analysts providing such services is often supported by sophisticated IT systems containing tens of thousands of problem solving documents for all aspects of the products concerned. Upon a problem being raised by a customer, a helpdesk analyst has to examine the problem and provide a quick solution meeting the particular concern of the customer. To achieve this, the helpdesk analyst often abstracts the problem into a few keywords. However, IR techniques based on keyword searches usually return, by far, too many documents and only a few of the listed documents turn out to be of any real use to the helpdesk analysts—a factor that inevitably jeopardises the effectiveness of the services which are rendered to the customer. In most cases, first line agents of the helpdesk services have very little time for finding an effective and practical solution to a single customer's problem, and the use of the traditional techniques based on keyword searches provides too much noise and returns too many documents to be easily exploited by the first level helpdesk staff.

Moreover, the handling of the references and documents that are retrieved by keyword-based search techniques requires professional skill and wide experience from the technicians in order to recognise, among the number of references being cited, a particular document which could be useful for solving the customer's problem. The need for such experience and professional skill is a further difficulty for the development of help-desk services which are notorious for being subject to a large turn-over of staff.

Therefore, it can be seen that in the area of helpdesk services, there is a particular need for improving searching techniques in order to enhance the relevance of the documents and references which are retrieved from a document repository.

However, whilst the techniques to be described below are particularly suited to this area, they nevertheless address the general problem of improving the access to a collection of documents or other resources which are stored within a database. Therefore application of the techniques in other areas is not excluded.

SUMMARY OF THE INVENTION

The present invention is directed to enabling the acceleration of the searching process in an IR System, for instance an enhanced tool for a helpdesk or hotline service, by taking into account the experience developed from the use of said system This object is achieved by a process for searching in a repository of resources indexed by a search engine, said process comprising: monitoring the access to said repository by users and maintaining a shortcut index to resources which are flagged by the users; processing at least some new queries entered by users with a first preliminary search within said shortcut index; and conducting a full search of the respository if the preliminary search is unsuccessful.

Each resource can be classified in accordance with at least a first classification level, in which case the query entered by a user can comprise information elements representative of at least said first classification level and said preliminary search can comprise the steps of: using said information elements for determining a list of shortcut links corresponding to resources which were already flagged by preceding users accessing said repository and which correspond to the same information elements; and displaying at least some of said identified resources. Preferably, the information elements include a set of keywords and a search based on the user query is carried out within the keywords for the determined list of shortcut links.

The process can comprise inviting the user to flag a displayed resource according to its usefulness.

In one implementation, said repository is a repository of electronic documents, with each document being classified in accordance with a first and a second classification level. The process can be arranged for use in a help-desk environment with a repository containing documents of problems-solving solutions, said first level classification being representative of a type of product and said second level of classification being representative of the nature of the problem to which said documents refer.

In preferred embodiments, said preliminary search is followed by a full search of the repository and by an access to a index comprising references to skilled analysts.

In effect, the process implements a cache mechanism for documents which are flagged as problem-solving documents. It provides a direct shortcut to these documents and thus can substantially accelerate the searching process. Only when the shortcuts do not provide an access to the right document, is the standard search performed, and/or an additional search to an index of experts.

In another aspect, the invention also provides a process comprising the establishment of a cache for documents extracted from said repository and which are identified as being problem solving documents contained within said repository. When a user formulates a query, the process first executes a partial search within the cache for the purpose of accelerating the searching process. Only when the cache does not provide relevant material, is a standard search executed.

The invention also provides a system for searching a repository of resources, said system comprising: program code elements for monitoring the access to said repository by users and maintaining a shortcut index to resources which are flagged by the users; and a search engine arranged to processing at least some new queries entered by users with a first preliminary search within said shortcut index; and to conduct a full search of the respository if the preliminary search is unsuccessful. Where each resource is classified in accordance with at least a first classification level, the system can comprise a user interface for receiving a query entered by a user comprising information elements representative of at least said first classification level and said search engine can be arranged to conduct said preliminary search by using said information elements for determining a list of shortcut links corresponding to resources which were already flagged by preceding users accessing said repository and which correspond to the same information elements.

DESCRIPTION OF THE DRAWINGS

An embodiment of the invention will now be described, by way of example only, with reference to the accompanying drawings, wherein:

FIG. 3 illustrates a database for a preliminary searching process;

DESCRIPTION OF THE PREFERRED EMBODIMENT OF THE INVENTION

Figure 1:
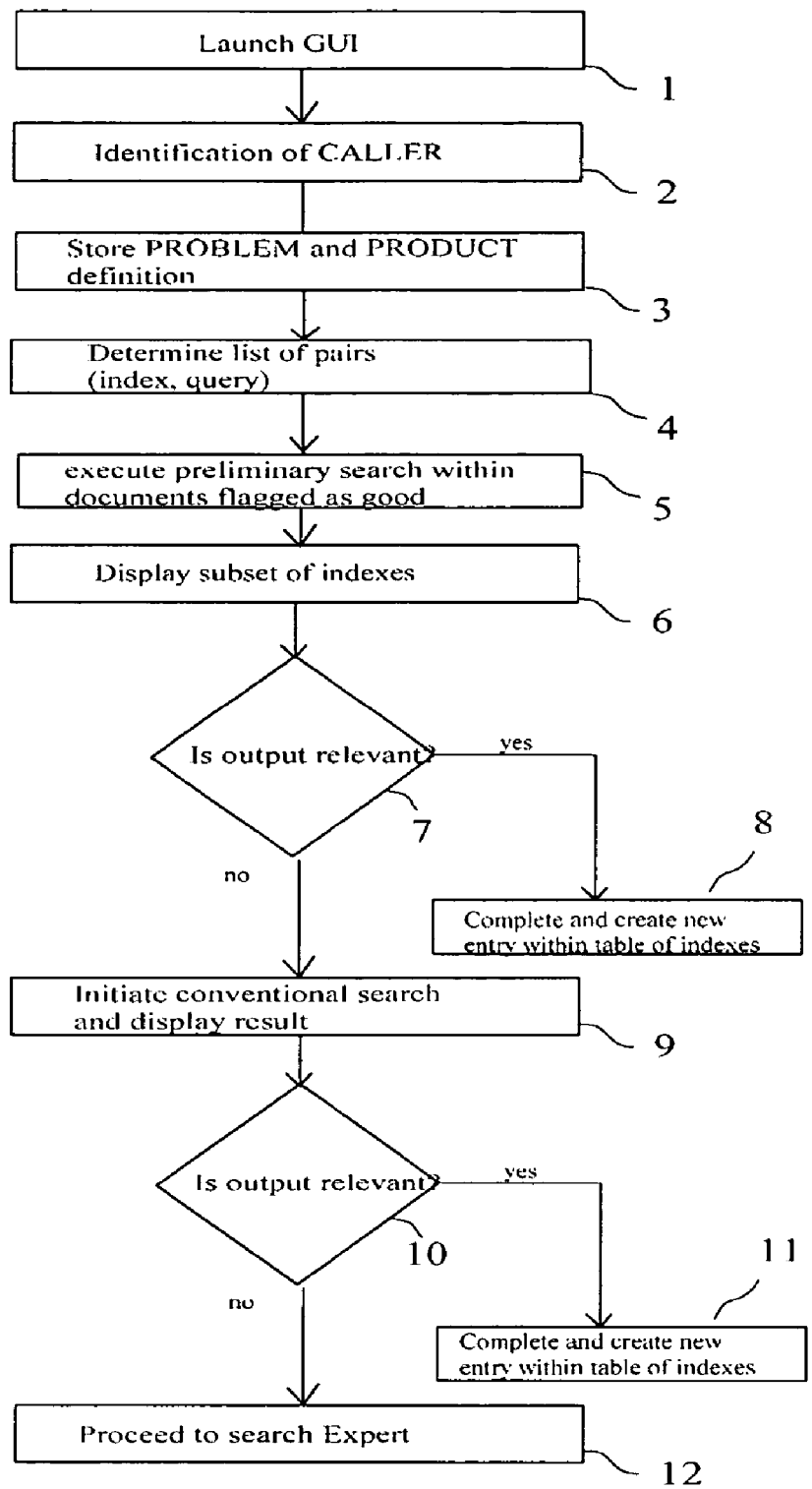
FIG. 1 illustrates a process that automatically creates a contextual index.

While the following process can be implemented for any kind of repository of documents, or other resources, or any type of knowledge base, the preferred embodiment will be more particularly described with reference to the arrangement of a repository of technical documents which serve to provide guidance and immediate remedial action for problems involved in the use of computers—including hardware and software problems. The process to be described is particularly suited for the design of a helpdesk tool which is used by helpdesk staff and analysts for providing quick and effective solutions to helpdesk customers.

The information retrieval process which is herein described is based on the use of a repository of documents partitioned in accordance with at least one classification and, preferably two or three levels of classification.

In the particular case of a help-desk service, a first level of partitioning of the repository is based on the cateqory of problems to which each document refers. Preferably, the category of problem will be that described in co-pending unpublished European patent application No: 02354046.1, Filed on Mar. 14, 2002, entitled "Process for Storing and Retrieving a Document within a Knowledge Base or Repository of Documents" by K. DELIC and L. DOUILLET, assigned to the assignee of the present application the contents of which is herein incorporated by reference for all purposes. Basically, the classification concerns the domain to which the particular problem refers and permits the partitioning of the knowledge base into a set of n predetermined imposed classes. In the example of a helpdesk tool used by computer manufacturers, the classes might for instance be "Install", "Boot", "Login/connect", "Print", "Usage", "Startup", "Error" and "General". While the number of classes which can be used for the purpose of partitioning the knowledge base can vary to a large extent, in the preferred embodiment, the number of classes is, for the reasons described in the above mentioned co-pending European patent application, limited to seven, thus providing seven large domains of problems which the help-desk analyst can refer.

A second level of partitioning is based on the type of product concerned. For a help-desk service related to computers, it could be advantageous to consider the type of operating system of the computer, but any other suitable classification could be considered.

Additional levels of partitioning of the database could, of course be used. The above mentioned copending European patent application teaches a classification mechanism which permits to distinguish between the documents and references providing direct guidance and operating instructions for a direct solution Is to a given problem. Three different tags/labels are used: FIX representing documents providing direct and immediate solutions; STEP NOTE which is a label/tag assigned to documents which provide step-by-step direct solutions to a particular problem. The last category which is defined is TECH NOTE: it is applied to documents providing background document relating to a problem, including drawings, and which require deeper insight on the part of the reader.

Once partitioned, preferably by means of an automated process as taught in the above mentioned European patent application, the knowledge base can be subjected to any standard search based on a query defined by the user.

In addition to the conventional searching mechanism, in the presently described arrangement, there is provided an separate indexing process which creates, in response to the use of the system by the users and their appreciation of the relevance of the documents being displayed, a special index which is used as a shortcut index—herein referred to as a P/S index—allowing a direct link to documents that have proved to be problem-solving (P/S) documents.

The P/S index of this subset of documents is created, updated and enriched in accordance with the usage of the Information Retrieval system and the experience gained from this usage. To achieve this, the process automatically tracks the use of the Information Retrieval system and, each time a user flags a consulted document as being good, an entry is created in the index associating the flagged document with the context of the searching process and recording the keywords that were used to retrieve the document when it was flagged as good.

In this way, there is provided an effective combination of a conventional searching mechanism—based on conventional indexes representative of the contents of the documents—with a shortcut index created in response to the experience of use of the system.

Figure 2:
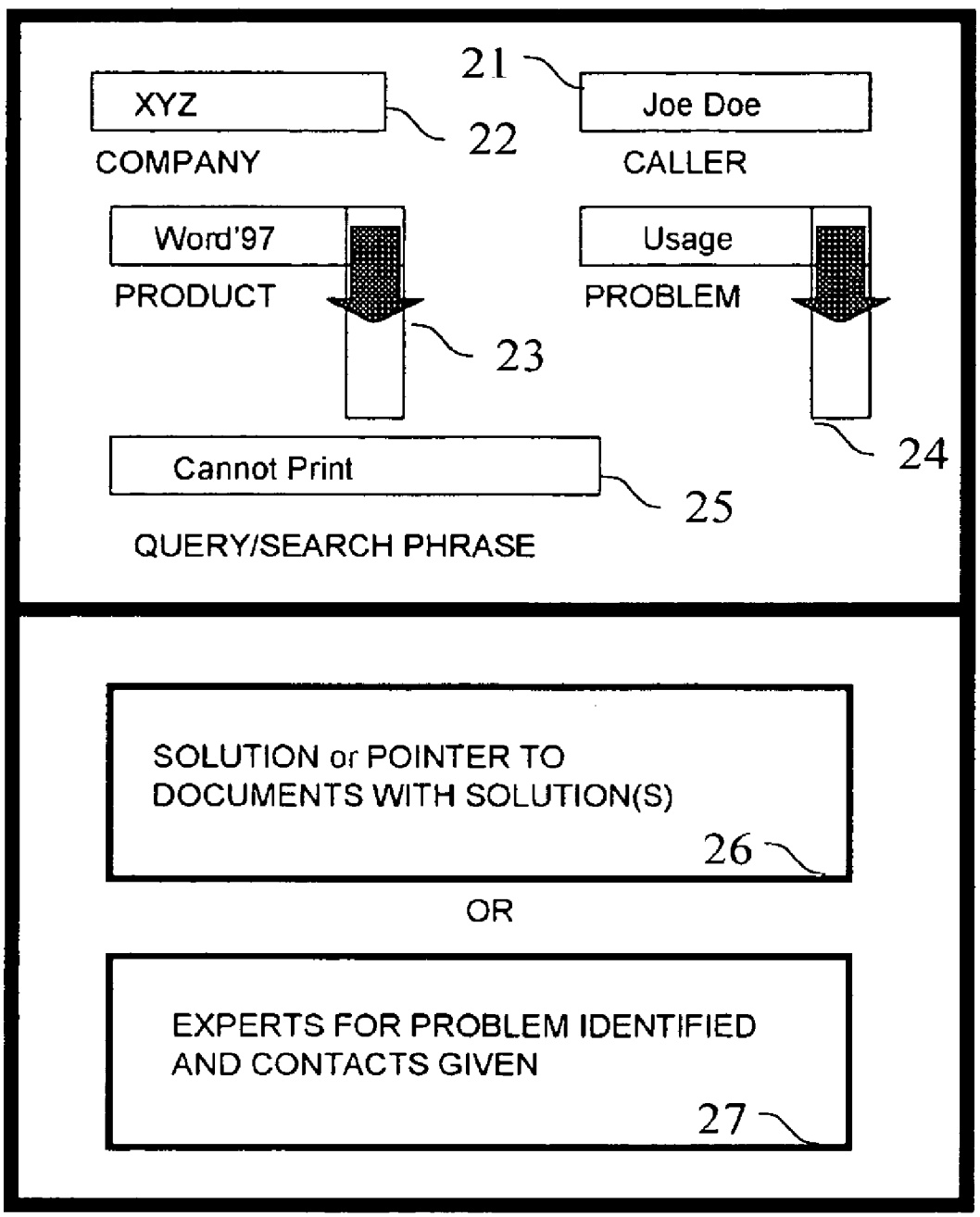
FIG. 2 illustrates a Graphical User Interface which is displayed to the user.

FIG. 1 more particularly illustrates a preferred embodiment of the searching process:

The process is generally launched, in a step 1, with a request generated by a customer or a user via an appropriate Graphical User Interface (GUI), such as is shown in FIG. 2.

In a step 2, the process preferably identifies the user. Different mechanisms can be used for performing this identification. Preferably, there is entered the name of the caller in a field 21 as shown in FIG. 2, possibly accompanied by the identification of the company to which the user belongs (field 22). In some embodiments, the process can be associated with the telecommunication switching system so that it can automatically derive the identification of the caller without manual typing. The identification of the user can be used as an element of the contextual environment and may be, for instance, associated with a profile.

In a step 3, the caller or the user is invited to define the type of PRODUCT (field 23) as well as the category of PROBLEM which the call concerns (field 24). In the perspective of arranging a help-desk system for computer systems, these two pieces of information represent basic elements of the context of the query. This information can be input by the user using an appropriate pop-down menu as illustrated in FIG. 2 (references 23 and 24), for instance. In the present embodiment, the identification of the caller is automatically mapped to one particular type of documents—for instance FIX, STEPNOTE and TECHNOTE—which corresponds to the profile of the user. This automatically adapts the resulting information to the skill level of the user or caller, and prevents that unskilled callers receive general background information that they cannot understand.

In addition, step 3 of the process involves the entering of a query within a field 25 using a few words describing the particular problem concerned.

In a step 4, the process executes a preliminary searching process which is based on the use of the contextual information entered by the user. From the definition of the category of PROBLEM, the type of PRODUCT, the type of document being searched (FIX, STEPNOTE or TECHNOTE) or any other contextual element being considered, there is provided a direct access to documents which were flagged as being good for the particular context being considered.

Figure 3:
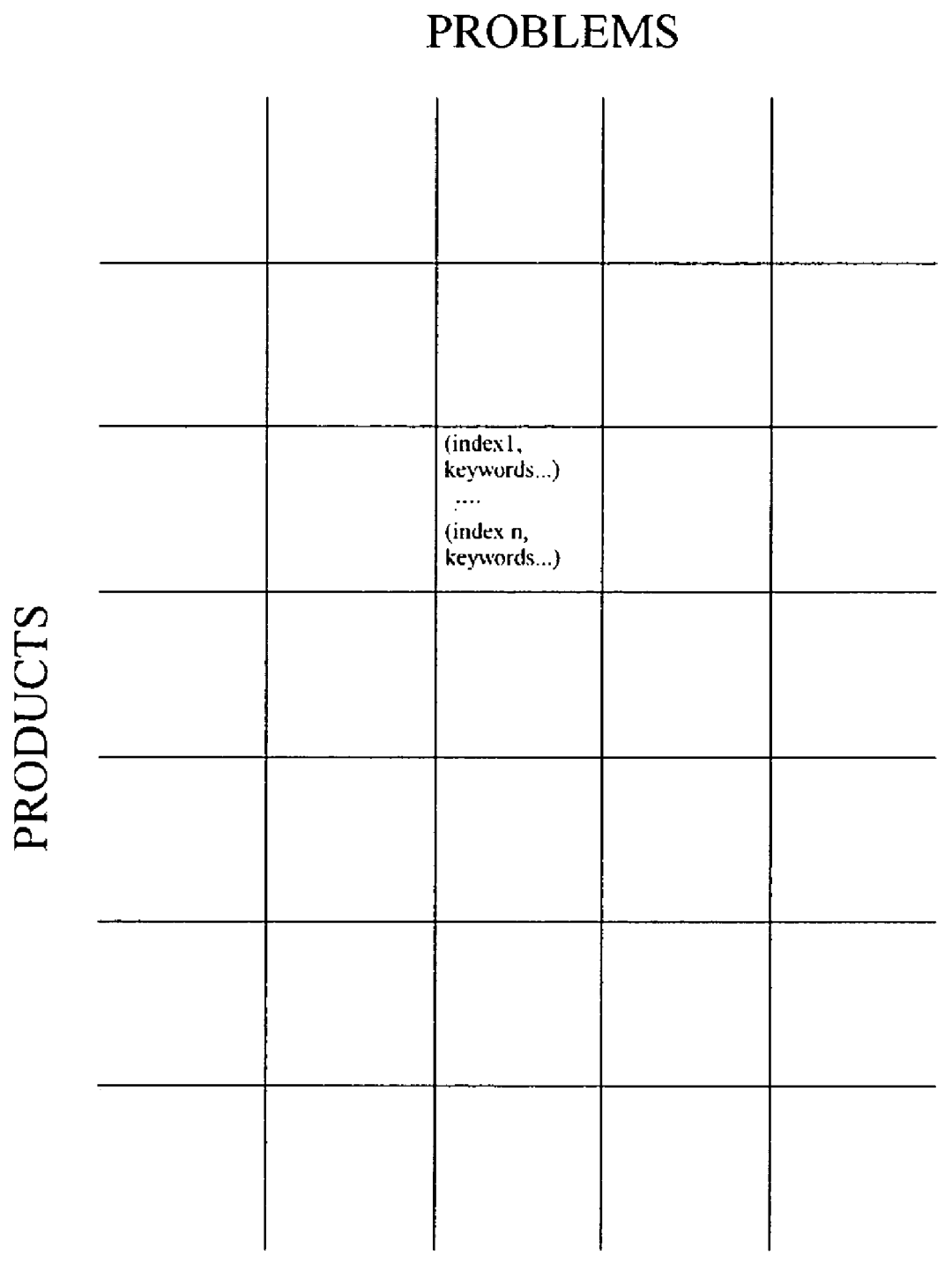

To achieve this, the process accesses a database of contextual indexes, and returns, for the problem and product being considered, a list of associated pairs linking indexes to flagged documents to the context of the query which permitted these documents to be flagged as being good. FIG. 3 illustrates the access of the database for a bi-dimensional database. Any suitable number of contextual elements can be used for the preliminary searching process.

From the information received in step 4, the process then launches in a step 5 a limited search within the keywords recorded for the documents which were already flagged as being good for the context concerned.

The documents that match the keyword search within the shortcut index are displayed to the user in a step 6, thus giving them direct access to documents flagged as problem solving documents for the particular context and keywords being considered. This is illustrated by the field 26 of FIG. 2. If one document is relevant, the user may input an additional positive appreciation and this flag is recorded in a step 8 for the purpose of updating the shortcut index. No additional searching is then required.

If the preliminary search does not permit a relevant document to be displayed to the user, then the process proceeds from step 7 to a step 9 wherein a normal searching process is launched within the repository as a whole.

The result of such a conventional search is displayed to the user in a step 10 and, if such display permits one relevant document to be appreciated as being good, then the process updates the shortcuts database in a step 11 and completes.

Figure 4:
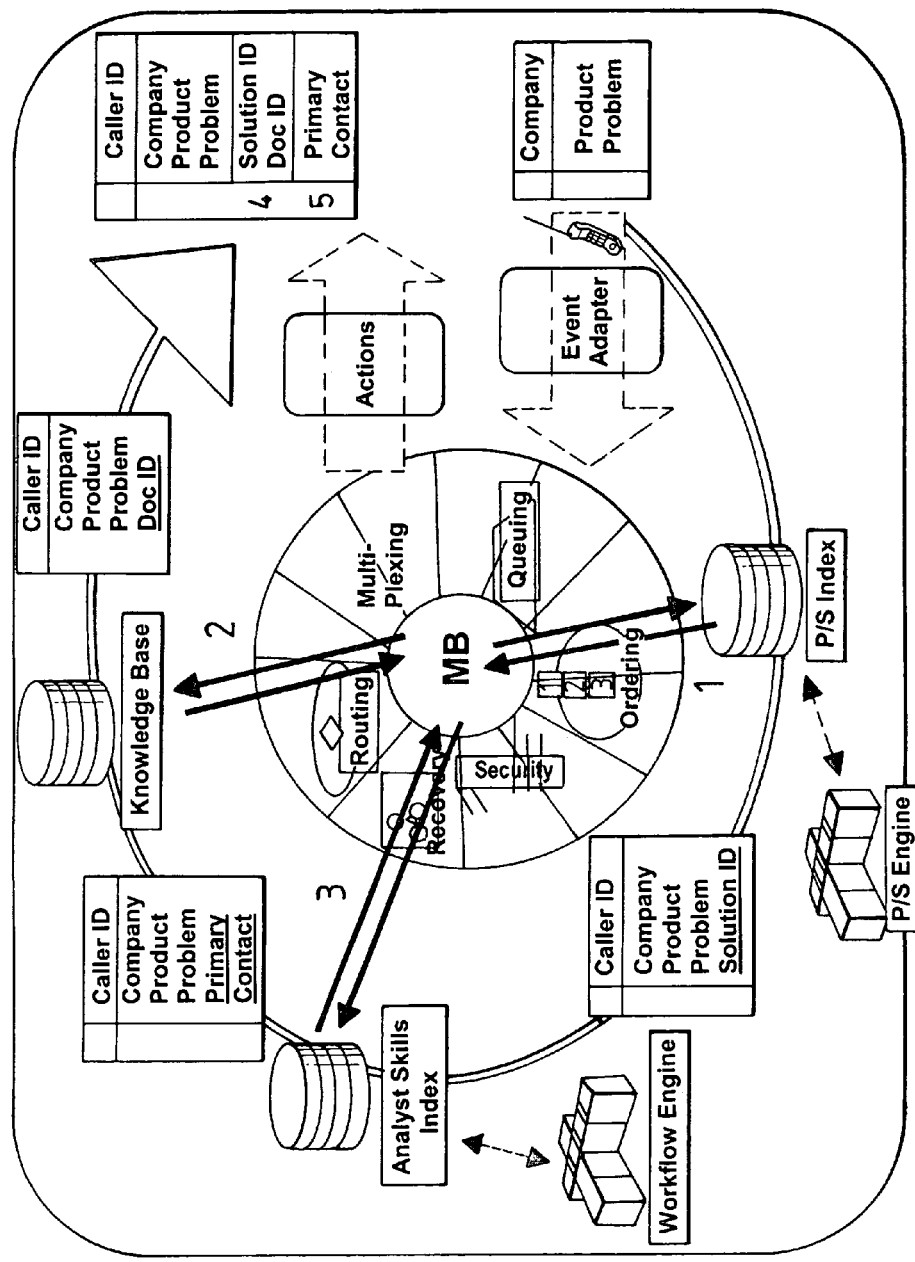
FIG. 4 illustrates an accelerated searching process.

In preferred embodiments, when the conventional searching process does not permit any relevant documents to be displayed to the user, the process then proceeds with a new search which is made in an index of ANALYST SKILLs, based on the same shortcut index mechanism as is used in step 4. More particularly, an Expert Index is arranged, associated with contextual elements, for the purpose of outputting direct links to appropriate experts. A three step searching process is thus achieved, that is shown in FIG. 4, illustrating the flow of the accesses to the different indexes involved: access to the Problem/Solving documents (P/S index); followed by an access to the whole database of documents, and possibly followed by an contextual access to an ANALYST SKILLS index.

The mechanism described above permits the development and maintenance of a cache of documents that have already proved useful for particular contexts and takes advantage of experience developed from past searches. It provides a direct shortcut to these documents and thus accelerates the searching process. Only when the shortcuts do not provide an access to the right document, is a full search of the knowledge base performed.

Figure 5:
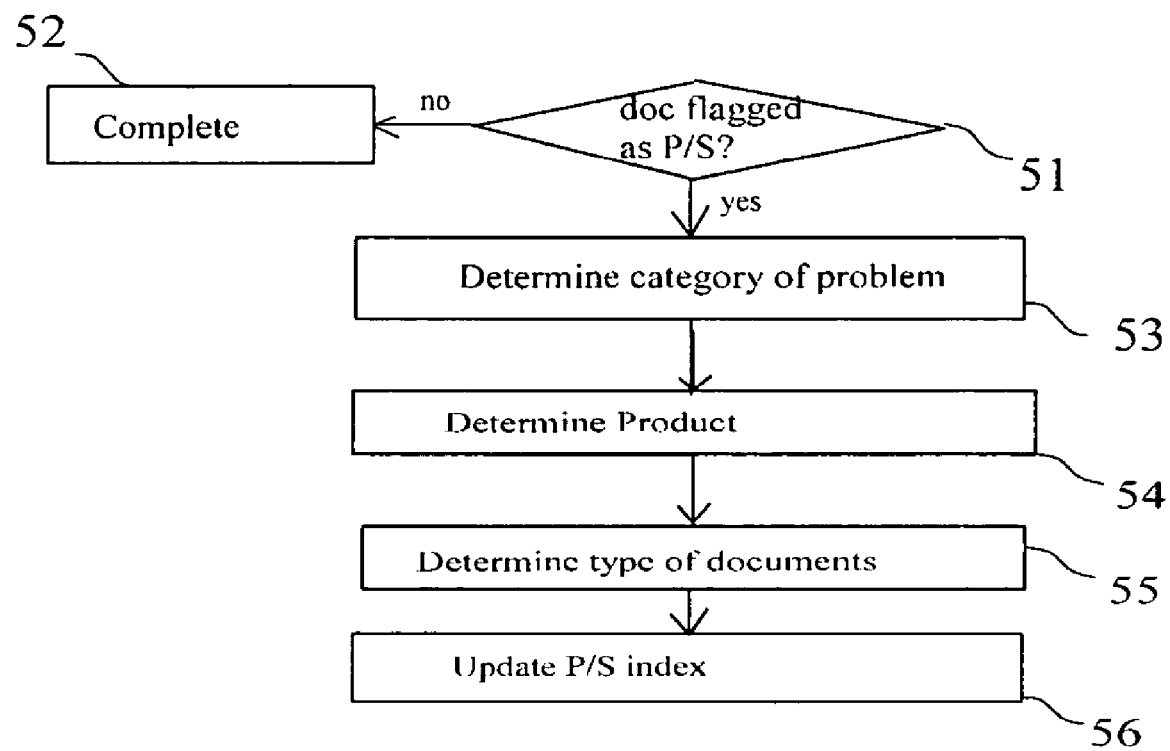
FIG. 5 illustrates a process for updating the Problem Solved index.

With respect to FIG. 5, there will now be described the process for updating the P/S index which is performed when the process monitors the user reaction to the use of the Information Retrieval system.

In a step 51, the monitoring process determines whether the current document being displayed to the user is flagged as being a good one. If this is not true, the process proceeds to a step 52 and then completes without any update.

If the document is recognized as being a good one, the process then proceeds to a step 53 where a new entry is created within the P/S index and the category of the problem is determined and stored in association with the new entry.

Similarly, in a step 54, the type of product being considered is determined.

Then, in a step 55, the type of documents is determined, preferably if it is a document of the type FIX, STEP NOTE or TECHNOTE as discussed above.

Finally, in a step 56, the process updates the P/S index which can thus be reused for further accesses to the repository.

This mechanism can be adapted to a wide number of situations and particularly can be combined in applications where different sets of resources should be accessed using search mechanisms.

The invention claimed is:

1. Process for searching a repository of resources indexed by a search engine, said process comprising:
   monitoring the access to said repository by users and maintaining a shortcut index to resources which are flagged by the users;
   processing at least some new queries entered by users with a first preliminary search within said shortcut index, wherein the first preliminary search is successful if at least one resource is found which has been flagged as being a good resource for a particular context of the searching process with respect to a user reguesting the search; and
   conducting a full search of the repository if the first preliminary search is unsuccessful.

2. A process as claimed in claim 1 wherein each resource is classified in accordance with at least a first classification level, the query entered by the user comprising information elements representative of at least said first classification level and said preliminary search comprising the steps of:
   using said information elements for determining a list of shortcut links corresponding to resources which were already flagged by preceding users accessing said repository and which correspond to the same information elements;
   displaying at least some of said identified resources.

3. A process as claimed in claim 2 wherein the information elements include a set of keywords and wherein a search based on the user query is carried out within the keywords for the determined list of shortcut links.

4. A process as claimed in claim 1 comprising inviting the user to flag a displayed resource according to its usefulness.

5. A process as claimed in claim 1 wherein said repository is a repository of electronic documents, with each document being classified in accordance with a first and a second classification level.

6. A process as claimed in claim 5 arranged for use in a help-desk environment with a repository containing documents of problems-solving solutions, said first level classification being representative of a type of product and said second level of classification being representative of the nature of the problem to which said documents refer.

7. A process as claimed in claim 6 wherein said preliminary search is followed by a full search of the repository and by an access to an index comprising references to skilled analysts.

8. A process as claimed in claim 1, wherein the particular context comprises a skill level of the user.

9. A system for searching a repository of resources, said system comprising:
 program code elements for monitoring the access to said repository by users and maintaining a shortcut index to resources which are flagged by the users; and a search engine arranged to processing at least some new queries entered by users with a first preliminary search within said shortcut index, wherein the first preliminary search is successful if at least one resource is found which has been flagged as being a good resource for a particular context of the searching process with respect to a user requesting the search; and to conduct a full search of the repository if the preliminary search is unsuccessful.

10. A system as claimed in claim 9 wherein each resource is classified in accordance with at least a first classification level, the system comprising a user interface for receiving a query entered by a user comprising information elements representative of at least said first classification level and wherein said search engine is arranged to conduct said preliminary search by using said information elements for determining a list of shortcut links corresponding to resources which were already flagged by preceding users accessing said repository and which correspond to the same information elements.

11. A system as claimed in claim 9, wherein the particular context comprises a skill level of the user.

12. Process for searching a repository of electronic documents indexed by a search engine with each document being classified in accordance with a first and a second classification level, the process being arranged for use in a help-desk environment with a repository containing documents of problems-solving solutions, said first level classification being representative of a type of product and said second level of classification being representative of the nature of the problem to which said documents refer, said process comprising:
 monitoring the access to said repository by users and maintaining a shortcut index to documents which are flagged by the users;
 processing at least some new queries entered by users with a first preliminary search within said shortcut index, each query entered by a user comprising information elements representative of at least said first classification level and said second classification level and a set of keywords;
 conducting a full search of the repository if the preliminary search is unsuccessful, wherein said preliminary search comprises:
 using said information elements for determining a list of shortcuts corresponding to documents which were already flagged by preceding users accessing said repository and which correspond to the same information elements;
 carrying out a search within sets of keywords associated with the determined list of shortcut links;
 displaying at least some of said identified documents and inviting the user to flag a displayed document according to its usefulness.

13. A data processing system having a mechanism for searching a repository of electronic documents indexed by a search engine with each document being classified in accordance with a first and a second classification level, the system being arranged for use in a help-desk environment with a repository containing documents of problems-solving solutions, said first level classification being representative of a type of product and said second level of classification being representative of the nature of the problem to which said documents refer, said system comprising:
 a monitoring arrangement for monitoring the access to said repository by users and for maintaining a shortcut index to documents which are flagged by the users;
 a user interface for allowing user to enter queries comprising information elements representative of at least said first classification level and said second classification level and a set of keywords;
 means arranged to process at least some new queries entered by users using preliminary search mechanism for carrying out a search in said shortcut index and to conduct a full search of the repository if the preliminary search is unsuccessful, wherein said preliminary search comprises:
 using said information elements for determining a list of shortcuts corresponding to documents which were already flagged by preceding users accessing said repository and which correspond to the same information elements; carrying out a search within sets of keywords associated with the determined list of shortcut links; and displaying at least some of said identified documents and inviting the user to flag a displayed document according to its usefulness.

* * * * *